US008259593B2

(12) United States Patent
Baker et al.

(10) Patent No.: US 8,259,593 B2
(45) Date of Patent: Sep. 4, 2012

(54) APPARATUS AND METHOD FOR SEGMENTING A COMMUNICATION NETWORK

(75) Inventors: Michael L. Baker, Perkasie, PA (US); Alexander Chernoguzov, Warrington, PA (US); Paul Gerhart, North Wales, PA (US); W. Russell Massey, Jr., Levittown, PA (US)

(73) Assignee: Honeywell International Inc., Morristown, NJ (US)

( * ) Notice: Subject to any disclaimer, the term of this patent is extended or adjusted under 35 U.S.C. 154(b) by 1036 days.

(21) Appl. No.: 11/170,202

(22) Filed: Jun. 29, 2005

(65) Prior Publication Data

US 2007/0008968 A1 Jan. 11, 2007

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. ............ 370/245; 370/240; 370/241.1; 370/242; 370/243; 370/244

(58) Field of Classification Search ........... 370/241.1, 370/242, 243, 244, 245
See application file for complete search history.

(56) References Cited

U.S. PATENT DOCUMENTS

| | | | |
|---|---|---|---|
| 5,361,256 A * | 11/1994 | Doeringer et al. | 370/390 |
| 5,394,402 A | 2/1995 | Ross | |
| 5,617,421 A | 4/1997 | Chin et al. | |
| 5,963,540 A * | 10/1999 | Bhaskaran | 370/218 |
| 5,963,556 A | 10/1999 | Varghese et al. | |
| 6,195,351 B1 * | 2/2001 | Hiscock et al. | 370/389 |
| 6,249,883 B1 * | 6/2001 | Cassidy et al. | 714/42 |
| 6,308,282 B1 | 10/2001 | Huang et al. | |
| 6,356,553 B1 | 3/2002 | Nagami et al. | |
| 6,556,575 B1 * | 4/2003 | Denio et al. | 370/401 |
| 6,560,236 B1 | 5/2003 | Varghese et al. | |
| 7,099,336 B2 * | 8/2006 | Kalkunte et al. | 370/398 |
| 7,313,613 B1 | 12/2007 | Brooking et al. | |
| 2002/0046357 A1 | 4/2002 | Huang et al. | |
| 2003/0165140 A1 | 9/2003 | Tang et al. | |

(Continued)

FOREIGN PATENT DOCUMENTS

| | | |
|---|---|---|
| CA | 2 433 576 | 7/2002 |
| WO | WO 00/79758 A2 | 12/2000 |
| WO | WO 03/073283 A1 | 9/2003 |

OTHER PUBLICATIONS

Sejun Song, "Fault Recovery Port-based Fast Spanning Tree Algorithm (FRP-FAST) for the Fault-Tolerant Ethernet on the Arbitrary Switched Network Topology," Oct. 2001, Emerging Technologies and Factory Automation, 2001. Proceddings. 2001 8$^{th}$ IEEE International Conference on pp. 325-332 vol. 1, IEEE.*

(Continued)

Primary Examiner — Jae Y Lee (57) ABSTRACT

A gateway is used to segment a network, such as a FAULT TOLERANT ETHERNET (FTE) network, into islands. The gateway receives traffic from a first island, forwards part of the traffic to a second island, and blocks another part of the traffic from being forwarded to the second island. The forwarded traffic could include unicast traffic. The blocked traffic could include broadcast or multicast traffic, including diagnostic messages from one or more nodes in the first island.

24 Claims, 5 Drawing Sheets

U.S. PATENT DOCUMENTS

| | | | | |
|---|---|---|---|---|
| 2004/0143755 | A1* | 7/2004 | Whitaker et al. | 713/200 |
| 2004/0203906 | A1* | 10/2004 | Kato et al. | 455/456.1 |
| 2004/0210623 | A1 | 10/2004 | Hydrie et al. | |
| 2005/0099955 | A1* | 5/2005 | Mohan et al. | 370/242 |
| 2005/0138432 | A1* | 6/2005 | Ransom et al. | 713/201 |
| 2007/0008968 | A1 | 1/2007 | Baker et al. | |
| 2007/0078667 | A1 | 4/2007 | Chand et al. | |

OTHER PUBLICATIONS

Sejun Song, "Fault Recovery Port-based Fast Spanning Tree Algorithm (FRP-FAST) for the Fault-Tolerant Ethernet on the Arbitrary Switched Network Topology," Oct. 2001, Emerging Technologies and Factory Automation, 2001. Proceddings. 2001 8th IEEE International Conference on pp. 325-332 vol. 1, IEEE.*

Peter J. Welcher, Grand Moerschel, "Cisco PIX Firewalls: Access Lists and Management," Apr. 6, 2002, Chesapeake NetCraftsmen.*

Peter J. Welcher, Grand Moerschel, "Cisco PIX Firewalls: Access Lists and Management," Apr. 6, 2002, Chesapeake NetCraftsme.*

Songt S., et al., Fault-Tolerant Ethernet Middleware for IP-Based Process Control Networks, IEEE 2000, Nov. 8, 2000, Piscataway, NJ, pp. 116-125.

* cited by examiner

APPARATUS AND METHOD FOR SEGMENTING A COMMUNICATION NETWORK

TECHNICAL FIELD

This disclosure relates generally to communication networks and more specifically to an apparatus and method for segmenting a communication network.

BACKGROUND

Communication networks, such as computing networks, routinely use switches, routers, and other nodes to transport information across the networks. Each of these nodes typically receives information in a network and identifies a destination for the information. Each of these nodes then typically forwards the information, either directly to the destination or indirectly to the destination through one or more other nodes.

Some types of networks do not scale very well compared to other types of networks. For example, it is often difficult to scale FAULT TOLERANT ETHERNET (FTE) networks to include a large number of nodes. As a particular example, FTE networks may have an implementation limit of 512 nodes in theory and approximately 200 or 300 nodes in practice. This may represent an inadequate number of nodes to provide desired functionality or coverage in a network.

SUMMARY

This disclosure provides an apparatus and method for segmenting a communication network.

In one embodiment, a method includes receiving traffic from one or more nodes in a first island of a network. The received traffic includes (i) unicast traffic from the one or more nodes in the first island, and (ii) at least one of broadcast traffic and multicast traffic including diagnostic messages from the one or more nodes in the first island. The method also includes forwarding the unicast traffic to a second island in the network. In addition, the method includes blocking at least a portion of the broadcast and multicast diagnostic messages from being forwarded to the second island.

In particular embodiments, the network represents a fault tolerant network. The fault tolerant network is segmented into the first and second islands without interfering with an ability of the one or more nodes in the first island and one or more nodes in the second island to route the traffic around one or more faults in the network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
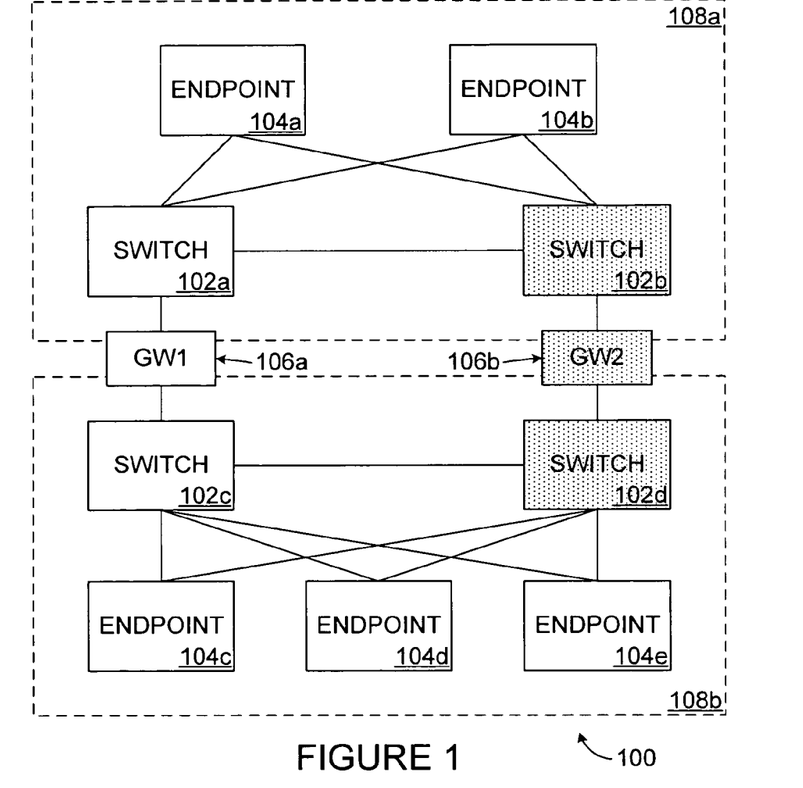
FIG. 1 illustrates an example communication network segmented into islands according to one embodiment of this disclosure.

FIG. 1 illustrates an example communication network 100 segmented into islands according to one embodiment of this disclosure. The embodiment of the communication network 100 shown in FIG. 1 is for illustration only. Other embodiments of the communication network may be used without departing from the scope of this disclosure.

In this example embodiment, the communication network 100 includes multiple switches 102a-102d and multiple endpoints 104a-104e. The switches 102a-102d communicate and transport information between various ones of the endpoints 104a-104e. For example, the switch 102a may receive information from the endpoint 104a and transmit the information to the switch 102c, and the switch 102c may forward the information to one or more of the endpoints 104c-104e. Depending on the layout of the network 100, each of the switches 102a-102d is typically coupled to one or more of the endpoints 104a-104e and/or one or more other switches. Each of the switches 102a-102d includes any hardware, software, firmware, or combination thereof for transporting information in the network 100. In this document, the term "couple" and its derivatives refer to any direct or indirect communication between two or more elements, whether or not those elements are in physical contact with one another.

The endpoints 104a-104e communicate with one another through the switches 102a-102d. The endpoints 104a-104e also perform any of a wide variety of additional functions in the network 100. For example, the endpoints 104a-104e could represent computing devices (such as desktop computers, laptop computers, server computers, personal digital assistants, and databases) that execute various applications for users. As another example, the endpoints 104a-104e could also represent control or manufacturing devices or systems in a process or production environment, such as controllers and other devices in a processing facility.

Depending on the function of the endpoints 104a-104e, the endpoints 104a-104e may communicate any suitable information through the switches 102a-102d. Also, the endpoints 104a-104e may use any suitable protocol or protocols for communicating information, such as Ethernet. In addition, each of the endpoints 104a-104e could be fixed in a specific location or be mobile, and the endpoints 104a-104e could communicate with the switches 102a-102d over wired or wireless connections. Each of the endpoints 104a-104e includes any hardware, software, firmware, or combination thereof for transmitting information and/or receiving information.

The communication network 100 also includes two gateways 106a-106b. The gateways 106a-106b facilitate communication between various ones of the switches 102a-102d. For example, the gateways 106a-106b may allow the switches 102a-102b to communicate with the switches 102c-102d and vice versa.

The gateways 106a-106b also segment or partition the communication network 100 into multiple islands 108a-108b. In this document, the term "island" refers to a subset of nodes in a communication network, where the subset includes one or some but not all of the nodes in the network. Also, the term "node" refers to any component in a network that provides or transports information in the network, such as an endpoint, switch, router, gateway, or other component.

In some embodiments, the communication network 100 represents a redundant or fault tolerant network that uses broadcast or multicast diagnostic traffic to diagnose network faults and maintain collective network state information. As examples, the communication network 100 could represent a FAULT TOLERANT ETHERNET (FTE) network from HONEYWELL INTERNATIONAL INC. or a Foundation Fieldbus High-Speed Ethernet (HSE) network. In general, an FTE or HSE network represents or includes a community of nodes, and the nodes may reside within a common subnet. In the example shown in FIG. 1, each of the islands 108a-108b could represent a community of nodes, although each community is smaller than the network 100 as a whole. The gateways 106a-106b are members of the network community in general and members of the islands 108a-108b.

To segment the network 100 into islands 108a-108b, the gateways 106a-106b limit or prevent diagnostic traffic from passing between the islands 108a-108b. In some embodiments, at least some of the nodes in the network 100 (such as the switches 102a-102d and gateways 106a-106b) periodically broadcast or multicast diagnostic messages. For example, these nodes could broadcast or multicast diagnostic messages that are used for network maintenance and fault detection and recovery. As a particular example, each of these nodes could transmit a diagnostic message once every second over each network cable coupled to the node. The diagnostic messages indicate that the node is operating and available in the network 100. The diagnostic messages are also used by components in the network 100 to route traffic in the network 100 and to avoid faults in the network 100. In this document, the phrases "diagnostic traffic" and "diagnostic messages" refer to broadcast or multicast messages that are periodically or repeatedly transmitted and that are used to identify network faults, keep an inventory of active nodes on a network, and/or provide network status information to a network administrator.

The gateways 106a-106b could prevent multicast and broadcast traffic from passing between the islands 108a-108b and allow only unicast traffic to pass between the islands 108a-108b. The multicast and broadcast traffic could include the diagnostic messages, so little or no diagnostic traffic may pass between the islands 108a-108b. In general, unicast traffic is traffic directed towards a single specified recipient, multicast traffic is traffic directed towards two or more specified recipients, and broadcast traffic is traffic directed towards one or more unspecified recipients or to all possible recipients.

Because diagnostic traffic is not transported between the islands 108a-108b, the amount of diagnostic traffic in any single island may be reduced. This may allow each of the islands 108a-108b to be scaled to include a larger number of nodes. As noted above, conventional FTE networks may have an implementation limit of 512 nodes in theory and approximately 200 or 300 nodes in practice. Often, these limits are caused by the diagnostic traffic in the networks. As the number of nodes in a network increases, the amount of diagnostic traffic also increases. The diagnostic traffic consumes both bandwidth and processing resources of nodes in the network. By reducing the diagnostic traffic in the islands 108a-108b, each of the islands 108a-108b could include a larger number of nodes. Also, islands could be added or removed as needed to provide the appropriate configuration for the network 100. Further, with reduced or minimized diagnostic traffic and broadcast and multicast traffic, remote islands and end points can be more easily connected through low-speed and long-distance communication links. In addition, less powerful nodes (such as nodes with less processing power) could be used in the network 100 because the nodes may need to process less traffic.

Figure 4:
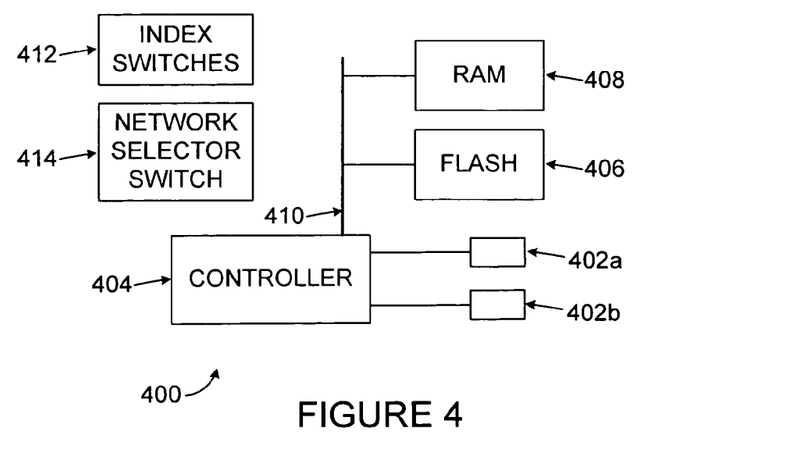
FIG. 4 illustrates an example gateway for segmenting a communication network into islands according to one embodiment of this disclosure.

Each of the gateways 106a-106b includes any hardware, software, firmware, or combination thereof for segmenting a network. For example, each of the gateways 106a-106b may include two half-drivers (such as half-FTE drivers) for upstream and downstream communications. One example embodiment of a gateway is shown in FIG. 4, which is described below.

The network 100 may be segmented into the different islands 108a-108b using any suitable criteria. For example, the network 100 may be segmented into the different islands 108a-108b based on the functions of the endpoints 104a-104e. As a particular example, the island 108b could be referred to as an "L1" island containing control or manufacturing devices or systems in a process or production environment. The island 108a could be referred to as an "L2" island containing computing devices, such as desktop computers, laptop computers, server computers, personal digital assistants, and databases. In this example, the nodes in the L1 island 108b could reside in a single cabinet or other structure housing multiple components. The network 100 could be segmented into any number of different islands using any other or additional criteria.

As shown in FIG. 1, each of the switches 102a-102d and endpoints 104a-104e has full FTE or HSE connectivity. For example, at least four paths may couple any of the switches 102a-102d or endpoints 104a-104e to any other of the switches 102a-102d or endpoints 104a-104e. Also, the gateways 106a-106b have two communication paths between them, one through the switches 102a-102b and another through the switches 102c-102d. This may allow the gateways 106a-106b to communicate with one another and coordinate their activities.

In this example embodiment, the switches 102a-102d and gateways 106a-106b are arranged in pairs. For example, the switches 102a-102b may represent a pair of switches, and the switches 102c-102d may represent another pair of switches. Similarly, the gateways 106a-106b may represent a pair of gateways forming a single logical device. As shown in FIG. 1, each pair of switches 102a-102d or gateways 106a-106b includes an unshaded switch or gateway and a shaded switch or gateway. In general, redundant networks like FTE or HSE networks include two networks that are independent of one another, except that switches in a pair (such as switches 102a-102b) are coupled to one another using crossover cables. The shading distinguishes the different networks. The different networks may be associated with different diagnostic messages, such as when the diagnostic messages have bits identifying the network associated with the messages. As a particular example, the networks could be associated with different colors (such as yellow for unshaded and green for shaded). Different colored cables could be used with the different networks. For example, yellow Ethernet cables could be used to couple switches 102a, 102c and the gateway 106a in the "yellow" network, while green Ethernet cables could be used to couple switches 102b, 102d and the gateway 106b in the "green" network.

In the event that one switch or gateway in a pair is lost in the network 100, the other switch or gateway in the pair is used to route traffic. For example, if gateway 106a in FIG. 1 is lost, the gateway 106b could be used to route traffic between the islands 108a-108b. Similarly, if the switch 102a in FIG. 1 is lost, the switch 102b could be used to route all traffic between the endpoints 104a-104b and the gateways 106a-106b. A switch or gateway could be lost in a network for any number of reasons, such as a network cable fault, a power failure, a hardware or software failure in the switch or gateway, or other cause.

Figure 2:
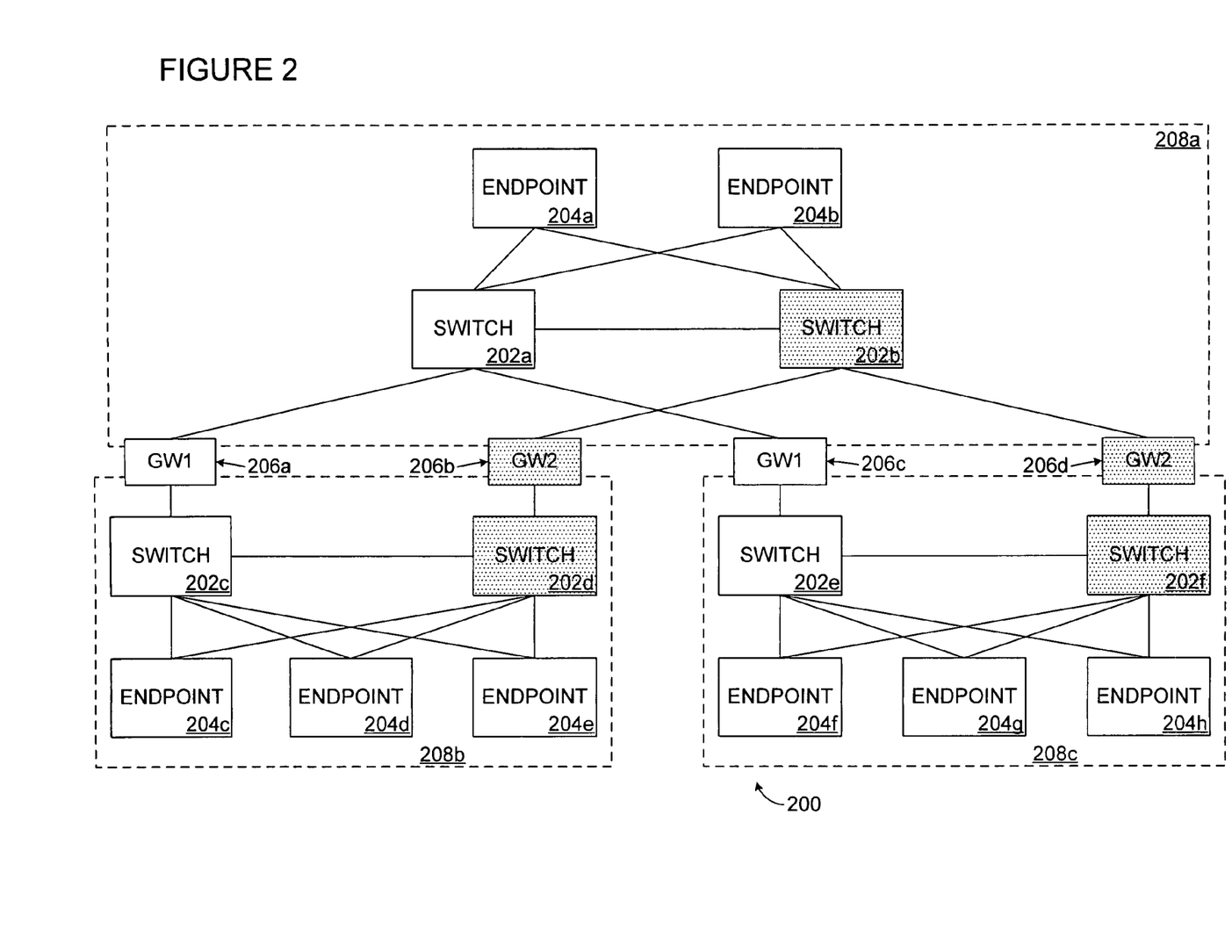
FIG. 2 illustrates a second example communication network segmented into islands according to one embodiment of this disclosure.

FIG. 2 illustrates a second example communication network 200 segmented into islands according to one embodiment of this disclosure. The embodiment of the communication network 200 shown in FIG. 2 is for illustration only. Other embodiments of the communication network may be used without departing from the scope of this disclosure.

In this example, the communication network 200 includes switches 202a-202f and endpoints 204a-204h. Also, the communication network 200 includes two pairs of gateways 206a-206d. The gateways 206a-206d segment the communication network 200 into three islands 208a-208c. In this example, the island 208a may represent an L2 island, and the islands 208b-208c may each represent an L1 island. Each L1 island could include a cabinet containing the nodes of that island.

Figure 3:
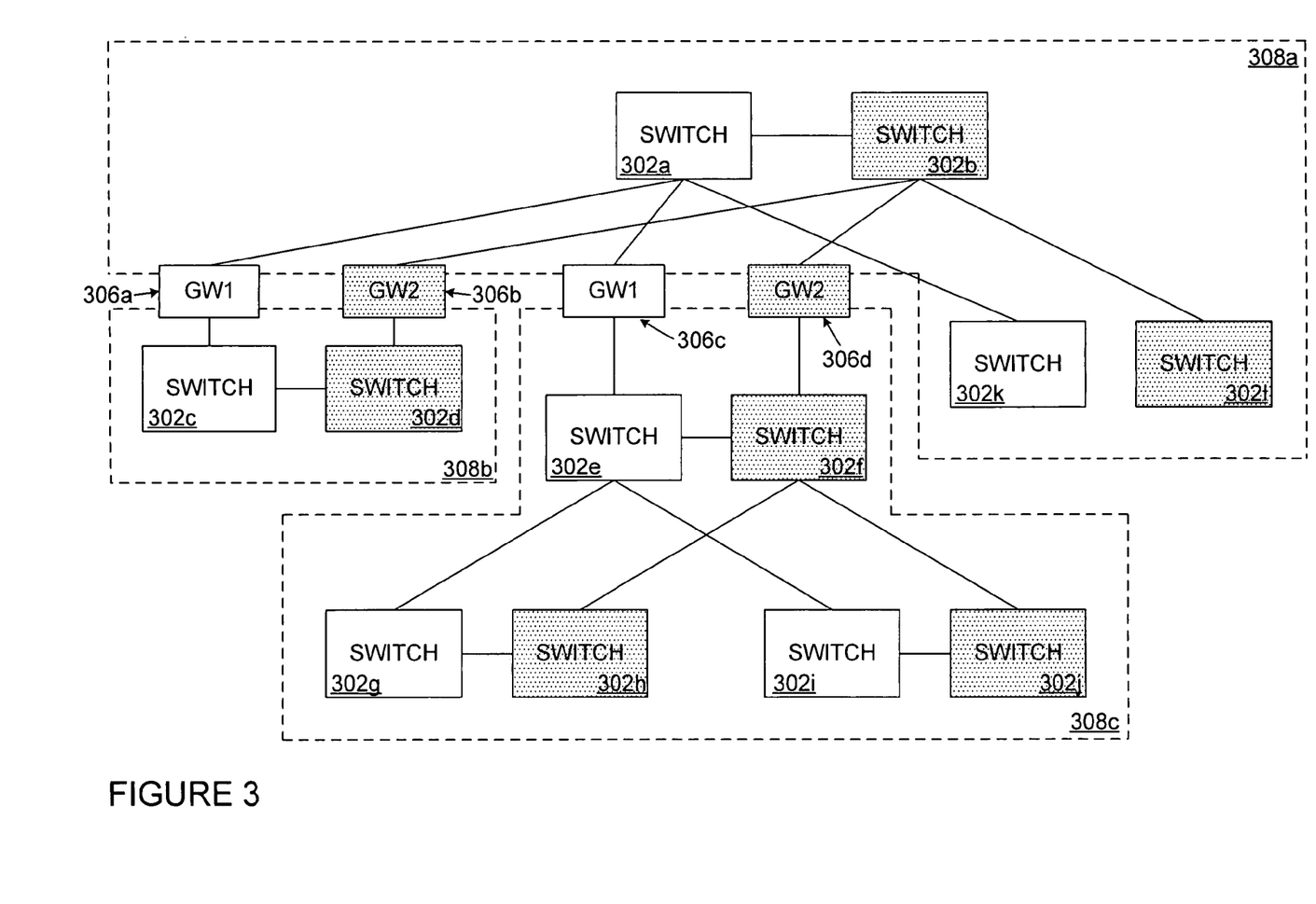
FIG. 3 illustrates a third example communication network segmented into islands according to one embodiment of this disclosure.

FIG. 3 illustrates a third example communication network 300 segmented into islands according to one embodiment of this disclosure. The embodiment of the communication network 300 shown in FIG. 3 is for illustration only. Other embodiments of the communication network may be used without departing from the scope of this disclosure.

In this example, the communication network 300 includes switches 302a-302l. Endpoints in the communication network 300 are omitted from FIG. 3. However, any suitable number of endpoints may be coupled to any of the switches 302a-302l.

The communication network 300 also includes two pairs of gateways 306a-306d, and the communication network 300 is segmented into three islands 308a-308c. In this example, the island 308a may represent an L2 island, and the islands 308b-308c may each represent an L1 island. Each of the switch pairs 302c-302j could represent a cabinet containing the nodes of that island, and multiple cabinets could form a single L1 island.

As shown in FIG. 3, the switches 302k-302l are coupled directly to the switches 302a-302b in the L2 island 308a. In some embodiments, the switches 302k-302l represent an expansion of the L2 island 308a. In particular embodiments, the switches 302k-302l could represent switches placed in a location that is remote from the other switches 302a-302b in the L2 island 308a. In this arrangement, each of the switches 302a-302b, 302k-302l would receive the diagnostic traffic from the other switches in the L2 island 308a. This illustrates that gateways are not required between every pair of switches in a network.

As shown in FIGS. 1 through 3, gateways may be used to segment a network into any number of islands according to particular needs. As noted above, the gateways may transport unicast traffic across a boundary between two islands but not multicast or broadcast traffic. In this way, the gateways may reduce or prevent diagnostic traffic for one network island from entering into another network island. Because of the reduced traffic, each network island could include more nodes because the bandwidth and processing requirements of the nodes in the islands are reduced.

In some embodiments, static routes are used to provide access to a gateway. For example, nodes in an island "below" a gateway in FIGS. 1 through 3 may use a default gateway for communication with nodes in other islands. As a particular example, based on an Internet Protocol (IP) address of the destination of traffic from a node in island 108b of FIG. 1, the traffic may be forwarded to a default gateway 106a. The default gateway 106a then routes the traffic to a node or island outside of the island 108b using the IP address of the destination. A default gateway may be established in any suitable manner, such as by configuring a Transmission Control Protocol/Internet Protocol (TCP/IP) stack in a node to use a default gateway.

Nodes in an island "above" a gateway in FIGS. 1 through 3 may also use static routes to access nodes below a gateway. In particular, a static route may be associated with each gateway on behalf of the nodes below the gateway. As a particular example, a static route to a gateway may be associated with a range of IP addresses for nodes below that gateway. When a first node wishes to communicate with a second node having an IP address within that range, the first node may use the static route associated with the range to communicate with the appropriate gateway, which then forwards traffic received from the first node to the second node. The use of the terms "above" and "below" here only relates to the relative positions of the nodes shown in FIGS. 1 through 3 and does not limit the scope of this disclosure.

The following represents several examples of inter-island and intra-island communications involving endpoints in a segmented communication network. These examples are for illustration only. Other or additional communications may take place in a network depending on the configuration of the network.

As a first example, inter-island communications between an L1 island and an L2 island could occur as follows. An endpoint in an L2 island that requires access to an endpoint in an L1 island uses a static route to one of the gateways coupling the L2 island and the L1 island. Unicast traffic is sent from the endpoint in the L2 island to the gateway using the static route, and the gateway forwards the traffic to the L1 island. The L1 island then forwards the traffic to the appropriate L1 endpoint.

As a particular example, the endpoint 104a in FIG. 1 could be configured to communicate with the gateway 106a using a static route through either switch 102a or switch 102b (which then communicates with gateway 106a through switch 102a). The gateway 106a receives and forwards unicast traffic from the endpoint 104a to the L1 island 108b. The L1 island 108b then routes the received traffic directly to the endpoint 104d through switch 102c or indirectly to the endpoint 104d through switch 102d.

A similar process may be used to route unicast traffic from an endpoint in an L1 island to an endpoint in an L2 island. The endpoint in the L1 island is configured to use a default gateway (such as gateway 106a in FIG. 1), and the default gateway forwards unicast traffic to the L2 island. Broadcast traffic and multicast traffic, however, are not forwarded by the gateways. As a result, broadcast and multicast traffic in an L1 island generally stays in the L1 island, and broadcast and multicast traffic in an L2 island generally stays in the L2 island.

As a second example, inter-island communications between endpoints in two L1 islands could occur as follows. An endpoint in a first L1 island that requires access to an endpoint in a second L1 island uses a default one of the gateways coupling the first L1 island and an L2 island. Unicast traffic is sent from the endpoint in the first L1 island to the default gateway, which forwards the traffic to the L2 island. The L2 island routes the traffic to the second L1 island, and the L2 island may or may not be coupled to the second L1 island using a second gateway. The second L1 island then forwards the traffic to the appropriate L1 endpoint in the second L1 island.

As a particular example, the endpoint 204c in the L1 island 208b of FIG. 2 could be configured to communicate with the gateway 206a. The gateway 206a receives and forwards unicast traffic from the endpoint 204c to the L2 island 208a. The traffic is routed in the L2 island 208a either through switch 202a or through switches 202a and 202b. One of the gateways 206c-206d receives and routes the traffic to the endpoint 204f through switch 202e or switch 202f in the L1 island 208c.

When routing traffic between islands, a gateway may use the network address of the destination to route traffic to another gateway. For example, as described in more detail below, gateways may be associated with a device index value, and an IP address of a gateway could be constructed using the device index of the gateway. As a particular example, gateway 206a may have a device index of "1", and nodes below the gateway 206a could have IP addresses of 0.1.x.x. Similarly, gateway 206c may have a device index of "6", and nodes below the gateway 206c could have IP addresses of 0.6.x.x. If a node with an IP address of 0.1.0.1 communicates traffic having a destination at IP address 0.6.0.7 to the gateway 206a, the gateway 206a can determine that the traffic should be rerouted to the gateway 206c based on the second value in the destination's IP address.

As a third example, intra-island communications in an L1 island or an L2 island could occur as follows. An endpoint in an island that requires access to another endpoint in the same island communicates with that other endpoint through the switches in the island. Traffic within an island is routed using the switches in that island without involving the gateways. For example, the endpoint 104c in the island 108b of FIG. 1 may communicate with the endpoint 104e through the switches 102c-102d, without involving gateways 106a-106b.

As noted above, each pair of gateways may form a single logical device in a network. In some embodiments, the pair of gateways is viewed inside an island and outside the island as a single device. Each pair of gateways may communicate using the switches in both islands coupled to the gateways. For example, the gateways 106a-106b in FIG. 1 may communicate with one another over the switches 102a-102b or over the switches 102c-102d. This allows the gateways to communicate if one of the gateways detects a fault in the network. Each of the gateways could further broadcast, multicast, or otherwise transmit diagnostic messages in the islands coupled to the gateways. A gateway in a pair could super-impose its own view of the network with the view of the other gateway in the pair to generate the diagnostic messages. The nodes in the islands may use these diagnostic messages to determine which of the gateways is available for use. In addition, the gateways may receive diagnostic messages from other nodes in the network. The gateways may use the diagnostic messages to determine how to route traffic in the network. As an example, the diagnostic messages could be used by the gateways to identify faults in the network. The gateways may then perform intelligent routing functions to route the traffic in the network and avoid the identified faults.

The following represents several examples of faults in a network and how nodes in islands of the network adjust their operations accordingly. These examples are for illustration only. Other or additional faults may occur and be resolved without departing from the scope of this disclosure. Moreover, the following illustrates how a segmented network is capable of tolerating the typical faults that are handled in non-segmented networks. In addition, the segmented network and the gateways do not introduce new failure cases that reduce fault tolerance of the overall network.

As a first example, a cable fault may occur in a network cable linking a gateway to an L2 island. For example, a cable fault may occur in the network cable linking the gateway 106a and the switch 102a in FIG. 1. When this occurs, the gateway 106a stops transmitting diagnostic messages in the L1 island 108b. Because of this, nodes in the L1 island 108b reroute all traffic to the other gateway 106b (such as rerouting the traffic within two seconds). Meanwhile, the gateway 106a reroutes all traffic received from the L1 island 108b to the gateway 106b through the switches 102c-102d. The gateway 106a also stops transmitting diagnostic messages in the L2 island 108a. Because of this, the nodes in the L2 island 108a reroute all traffic to the other gateway 106b (such as rerouting the traffic within two seconds). Another switchover mechanism could involve the gateway 106a informing the other gateway 106b of the failure using the switches 102c-102d in the island 108b. Also, a similar process could occur if the cable fault occurs in the network cable linking the gateway and an L1 island.

As a second example, a gateway coupling an L1 island and an L2 island could fail. For example, the gateway 106a in FIG. 1 could fail, such as the gateway 106a losing power. When this occurs, the gateway 106a no longer transmits diagnostic messages in either of the islands 108a-108b. The nodes in the islands 108a-108b then reroute all traffic to the other gateway 106b (such as rerouting the traffic within two seconds).

The nodes in the various islands of a network may communicate using any suitable mechanism. For example, the nodes in the islands of a network may be assigned both a network address and a device index. For example, IP addresses may be used in a network. In some embodiments, nodes in an L2 island may have different network addresses than nodes in an L1 island, and network addresses could be reused in different L1 islands. A gateway itself may be assigned one network address in one island and a different network address in another island, and the gateway may have the same device index in both islands. In particular embodiments, the network addresses in an L2 island may be public or private, network addresses in an L1 island could represent link-private class A network 0.0.0.0/8 addresses, and each island may be sub-netted into a class C subnet by specifying 255.255.255.0 as a subnet mask. Also, in particular embodiments, an L2 network address for a gateway is allocated from an L2 address space, and an L1 network address for the same gateway is constructed from the device index of the gateway (such as an IP address of 0.GatewayDeviceIndex . . . 0). The network address of other nodes in an L1 island may be constructed from the device index of an associated gateway and a device index of the node (such as an IP address of 0.GatewayDeviceIndex . . . NodeDeviceIndex). Among other things, this may allow the same private IP address range to be used across multiple communities in the islands.

While the gateways have been described as preventing all diagnostic traffic from flowing between two islands, the gateways could also reduce the diagnostic traffic between two islands. In these embodiments, the gateways could still allow some traffic to cross a boundary of two islands. Also, the gateways could allow messages such as maintenance messages to pass between islands. The maintenance messages could represent messages that identify faults in a network and that are provided to maintenance nodes in the network. In some embodiments, the maintenance messages are not blocked by the gateways in the network, which helps to ensure that the maintenance nodes in the network receive the maintenance messages. Further, the gateways could allow network time protocol (NTP) traffic to pass between islands and allow simple network management protocol (SNMP) access to switches in an L1 island. In addition, because each of the gateways may collect or provide access to status information from nodes "below" the gateway, the network status for nodes within an island can be proxied by the gateway.

Although FIGS. 1 through 3 illustrate various examples of communication networks 100-300 segmented into islands, various changes may be made to FIGS. 1 through 3. For example, gateways could be used in any other or additional network to provide any suitable network configuration. Also, a network in which the gateways are used could include any other or additional components. Further, gateways could be coupled to L1 and L2 islands using any suitable transmission media, such as copper media to an L1 island and copper or fiber optic media to an L2 island. In addition, a gateway could be integrated into a switch or implemented as a stand-alone device in the network. As a particular example, a gateway could be integrated with an L1 switch, such as a nine-port switch, a 26-port switch, a nine-port switch with a dedicated copper or fiber optic uplink for connection to an L2 island, or a 26-port switch with a dedicated copper or fiber optic uplink for connection to an L2 island.

FIG. 4 illustrates an example gateway 400 for segmenting a communication network into islands according to one embodiment of this disclosure. The embodiment of the gateway 400 shown in FIG. 4 is for illustration only. Other embodiments of the gateway could be used without departing from the scope of this disclosure. Also, the gateway 400 shown in FIG. 4 could be used as any of the gateways shown in FIGS. 1 through 3.

As shown in FIG. 4, the gateway 400 includes two ports 402a-402b. The ports 402a-402b represent structures capable of being coupled to network cables or other connections coupling the gateway 400 to other components in a network. For example, each of the ports 402a-402b may represent a structure capable of being coupled to an Ethernet cable, such as an RJ-45 jack capable of being coupled to a category 5 (Cat5) cable. In some embodiments, the ports 402a-402b are used to couple the gateway 400 to other nodes in an L2 island and an L1 island.

The gateway 400 also includes a controller 404. The controller 404 is capable of controlling the operation of the gateway 400. For example, the controller 404 could receive traffic through one of the ports 402a-402b and determine whether the traffic should be transmitted through the other of the ports 402a-402b. As a particular example, the controller 404 could determine whether the received traffic represents unicast, broadcast, or multicast traffic. The controller 404 could forward unicast traffic from one of the ports 402a-402b to the other of the ports 402a-402b while blocking broadcast and multicast traffic.

The controller 404 includes any hardware, software, firmware, or combination thereof for controlling the gateway 400. The controller 404 could, for example, represent an MPC8255, MPC8260, or MPC8270 processor from FREESCALE SEMICONDUCTOR INC. The controller 404 could also represent any processor capable of saturating two 100 megabit Ethernet links. In particular embodiments, the controller 404 implements two half-drivers, one for communication with an L1 island and another for communication with an L2 island. Also, in particular embodiments, the controller 404 has an interrupt-driven or timer-driven design that requires no operating system.

In some embodiments, the functions of the controller 404 are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

Two memories 406-408 are coupled to the controller 404 by a bus 410. The memories 406-408 are capable of storing any suitable information generated or used by the controller 404. For example, the memory 406 could represent a flash memory or other memory capable of storing instructions executed by the controller 404. The memory 408 could represent a random access memory (RAM) or other memory capable of storing data generated or used by the controller 404 during execution of the instructions. Each of the memories 406-408 includes any suitable volatile or non-volatile storage and retrieval device or devices.

The bus 410 couples the controller 404 and the memories 406-408. The bus 410 represents any suitable structure capable of transporting information between the controller 404 and the memories 406-408. The bus 410 could, for example, represent a 82xx bus used with an MPC8255, MPC8260, or MPC8270 processor.

In addition, the gateway 400 includes various switches 412-414 that configure the operation of the gateway 400. In this example, one or more index switches 412 are used to define the device index of the gateway 400. The device index represents a numerical or other identifier that is uniquely associated with the gateway 400 in a network. The one or more index switches 412 represent any suitable structure(s) for defining a numerical or other identifier. The index switches 412 could, for example, represent one or more rotary binary coded decimal (BCD) switches. As a particular example, three rotary BCD switches (0-900, 0-90, and 0-9) could define the device index of the gateway 400, where the device index is restricted to a value between 1 and 511.

A network selector switch 414 is used to define which network the gateway 400 operates within in a network. For example, the network selector switch 414 could define whether the gateway 400 operates in a "yellow" or "green" network in an FTE or HSE network. A proper identification of the yellow or green network may be needed to ensure appropriate operation of the gateway 400. As examples, proper identification of the yellow or green network may be needed so that the gateway 400 sets the appropriate bits in messages it transmits and so that the gateway 400 correctly interprets diagnostic messages it receives. The network selector switch 414 represents any suitable structure(s) for identifying one of multiple networks.

In one aspect of operation, the gateway 400 may use one or multiple timers (such as timers implemented in the controller 404) to control various operations of the gateway 400. For example, timers may be used to control when the controller 404 transmits diagnostic messages through the ports 402a-402b to the L1 and L2 islands. The diagnostic messages may contain any suitable information and may indicate that the gateway 400 is operating and available in a network. In particular embodiments, the controller 404 implements the timers in software, and the timers may be based on interrupts from a hardware clock or an operating system clock.

When routing unicast traffic between islands, the gateway 400 may perform fast routing of the traffic involving few calculations. For example, the controller 404 may not need to perform any IP packet manipulations and may only substitute medium access control (MAC) addresses as needed to route IP packets in the network. Also, original checksums or other fault-detection data in the IP packets could be preserved. The controller 404 could also perform port filtering to allow only authorized traffic to enter an L1 island. By allowing only authorized unicast traffic (such as unicast traffic from particular nodes in an L2 island) to enter an L1 island, the gateway 400 may provide a high level of security for L1 islands.

Although FIG. 4 illustrates one example of a gateway 400 for segmenting a communication network into islands, various changes may be made to FIG. 4. For example, the device index switch(es) 412 and the network selector switch 414 could be omitted in the gateway 400, and the information from those switches 412-414 could be stored in a memory. Also, the gateway 400 could include more than two ports, such as when the gateway 400 is coupled to three or more islands.

Figure 5:
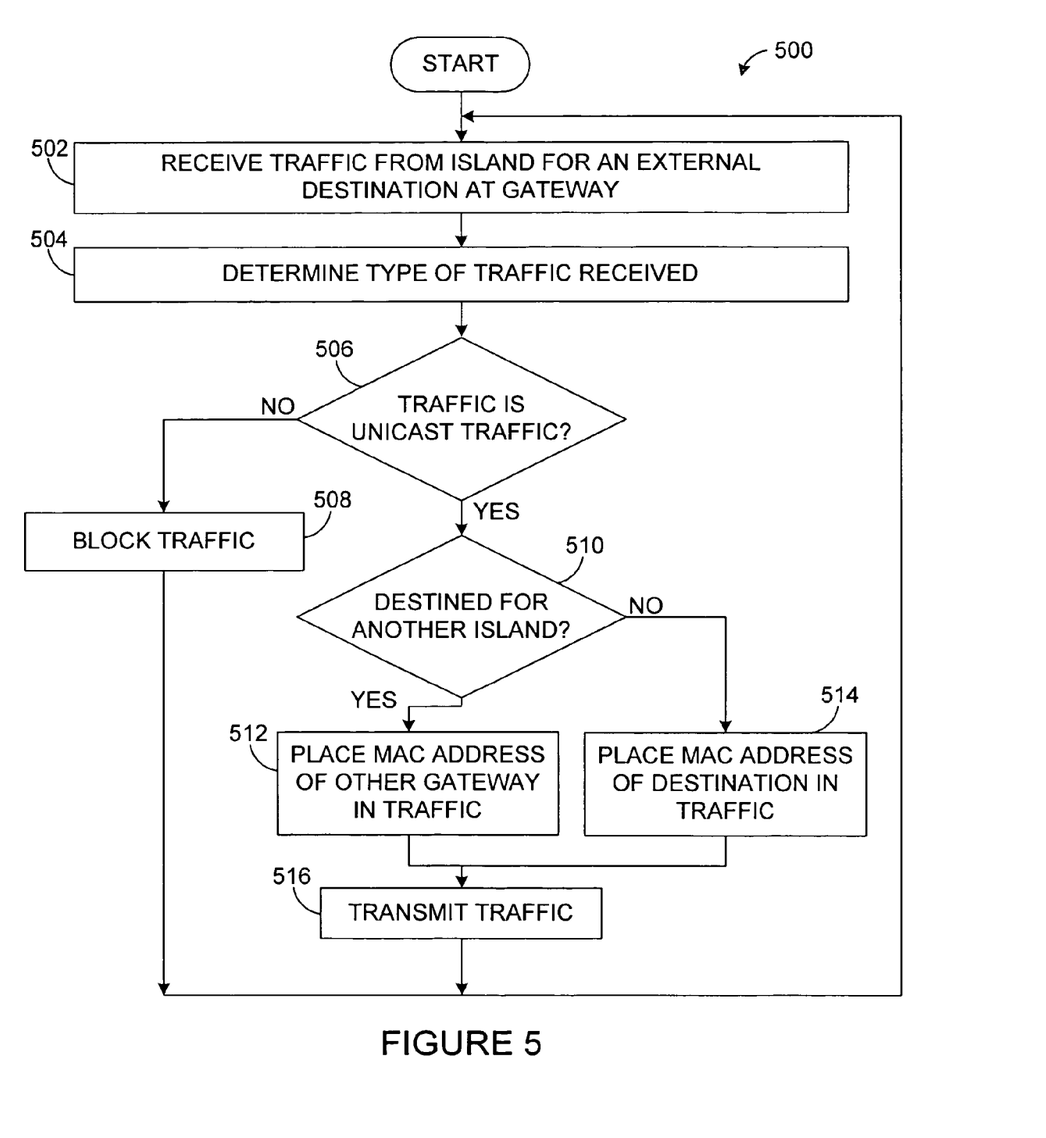
FIGS. 5 and 6 illustrate example methods for segmenting a communication network into islands according to one embodiment of this disclosure.
Figure 6:
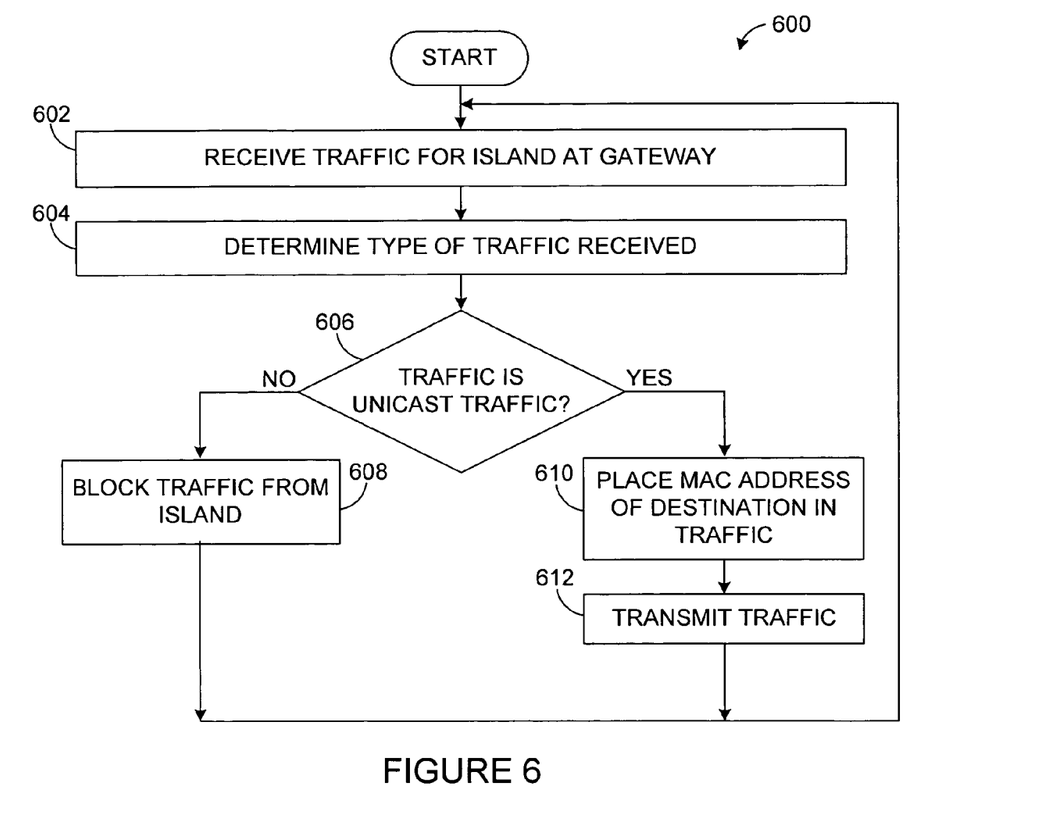

FIGS. 5 and 6 illustrate example methods for segmenting a communication network into islands according to one embodiment of this disclosure. In particular, FIG. 5 illustrates an example method 500 for routing traffic from an island to a destination outside of the island. FIG. 6 illustrates an example method 600 for routing traffic received from a source outside of an island to a destination inside the island. For ease of explanation, the methods 500, 600 are described with respect to the gateway 400 of FIG. 4 operating in the network 100 of FIG. 1. The methods 500, 600 could be used by any other suitable device and in any other suitable system.

In FIG. 5, the gateway 400 receives traffic from an island at step 502. This may include, for example, the gateway 400 receiving an IP packet or other traffic from an L2 island 108*a* or from an L1 island 108*b*. This may also include the controller 404 of the gateway 400 receiving the traffic through one of the two ports 402*a*-402*b*. The destination of the traffic is external to the island that provided the traffic.

The gateway 400 identifies the type of received traffic at step 504. This may include, for example, the controller 404 of the gateway 400 determining if the received IP packet is a unicast, broadcast, or multicast transmission. The controller 404 may use any suitable technique to identify the type of received traffic.

The gateway 400 determines if the received traffic is unicast traffic at step 506. As part of this determination, the controller 404 could determine whether the traffic is unicast traffic from an authorized source, such as by performing port filtering. If not, the gateway 400 blocks the traffic at step 508. This may include, for example, the controller 404 not forwarding the received traffic to the external destination. The gateway 400 then returns to step 502 to receive and process additional traffic.

If the traffic is unicast traffic, the gateway 400 determines if the received unicast traffic is destined for another island at step 510. Depending on the arrangement of the network, the destination of the traffic may or may not reside in another island. The gateway 400 could make this determination in any suitable manner, such as by examining the second value in the IP address of the destination. If the second value represents the device index of another gateway, the destination resides in another island.

If the destination resides in another island, the gateway 400 places the MAC address of another gateway in the traffic at step 512. Otherwise, the destination does not reside in another island (but still resides outside of the island generating the traffic), and the gateway 400 places the MAC address of the destination in the traffic at step 514. This may include, for example, the controller 404 placing the MAC address of the other gateway or the destination in one or more IP packets. The IP packets may already contain a MAC address (such as the MAC address of the gateway 400), so the gateway 400 may replace the current MAC address with the new MAC address.

The device index of another gateway and the MAC address of the other gateway or the destination may be determined in any suitable manner. For example, the controller 404 in the gateway 400 could maintain one or more diagnostic tables in one or more memories, such as one or more of memories 406-408. Among other things, the diagnostic tables could include the device indexes of other gateways and the MAC addresses of other nodes in a network. The device indexes and MAC addresses could be identified when the gateway 400 receives diagnostic traffic from the other nodes. The controller 404 may access the diagnostic tables to identify the device index or MAC address of a particular component (such as the other gateway or the destination) and use this information in any of steps 510-514.

The gateway 400 then transmits the received traffic at step 516. This may include, for example, the controller 404 forwarding the received traffic to the destination or another gateway for delivery to the destination. The gateway 400 then returns to step 502 to receive and process additional traffic.

In FIG. 6, the gateway 400 receives traffic for an island coupled to the gateway 400 at step 602. This may include, for example, the gateway 400 receiving an IP packet or other traffic from an L2 island 108*a* or from an L1 island 108*b*.

The gateway 400 identifies the type of received traffic at step 604 and determines if the received traffic is unicast traffic at step 606. If not, the gateway 400 blocks the traffic from the island at step 608. The gateway 400 then returns to step 602 to receive and process additional traffic.

Otherwise, the traffic is unicast traffic destined for the island coupled to the gateway 400. The gateway 400 places the MAC address of the destination in the traffic at step 610. This may include, for example, the controller 404 placing the MAC address of the destination in one or more IP packets. The gateway 400 then transmits the received traffic to the destination within the island at step 612. The gateway 400 then returns to step 602 to receive and process additional traffic.

Although FIGS. 5 and 6 illustrate examples of methods 500, 600 for segmenting a communication network into islands, various changes may be made to FIGS. 5 and 6. For example, rather than blocking all broadcast or multicast traffic, the gateway 400 could allow some broadcast or multicast traffic to cross a boundary between two islands. Also, maintenance messages or other types of messages could be passed between two islands. In addition, FIGS. 5 and 6 illustrate how a gateway 400 handles inter-island traffic. In the case of intra-island traffic, the gateway 400 may not need to perform any functions to ensure proper delivery of the traffic.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising a first gateway, the first gateway comprising:
   at least two ports configured to receive traffic from at least a first island and a second island of a network, the received traffic comprising (i) unicast traffic from one or more nodes in the first island, and (ii) at least one of broadcast traffic and multicast traffic comprising diagnostic messages, wherein the diagnostic messages comprise one or more maintenance messages from the one or more nodes in the first island; and
   a controller configured to:
      determine whether the unicast traffic is destined for the second island;
      if the unicast traffic is destined for the second island, replace a medium access control (MAC) address in the unicast traffic with a MAC address of a second gateway and forward the unicast traffic to the second gateway for delivery to one or more nodes in the second island, each of the one or more nodes in the second island having an address containing a device index of the second gateway;
      if the unicast traffic is not destined for another island, replace the MAC address in the unicast traffic with a MAC address of a destination and forward the unicast traffic to the destination;
      block a portion of the broadcast and multicast diagnostic messages from being forwarded to the second island; and
      forward the one or more maintenance messages to the second island, wherein the one or more maintenance messages are configured to provide island-specific address information related to a location of any faults within the first island.

2. The apparatus of claim 1, wherein:
   the network comprises a fault tolerant network; and
   the apparatus is configured to segment the fault tolerant network into the first and second islands without interfering with an ability of the one or more nodes in the first island and the one or more nodes in the second island to route the traffic around one or more faults in the network.

3. The apparatus of claim 1, wherein:
   the received traffic further comprises (i) unicast traffic from the one or more nodes in the second island, and (ii) at least one of broadcast traffic and multicast traffic comprising diagnostic messages from the one or more nodes in the second island; and
   the controller is further configured to:
      forward the unicast traffic received from the second island to the first island; and
      block at least a portion of the broadcast and multicast diagnostic messages received from the second island from being forwarded to the first island.

4. The apparatus of claim 1, wherein the controller is further configured to:
   initiate transmission of diagnostic messages in both the first and second islands; and
   when communication with one of the islands is lost, stop the transmission of the diagnostic messages in both the first and second islands.

5. The apparatus of claim 1, wherein at least one of the one or more nodes in the first island is configured to reroute traffic directed towards the first gateway to a third gateway based on a lack of a receipt of a diagnostic message from the first gateway.

6. The apparatus of claim 1, wherein the apparatus is associated with a first network address in the first island and a second network address in the second island.

7. The apparatus of claim 6, wherein:
   the first network address comprises an address from an address space of the first island; and
   the second network address comprises a device index value associated with the apparatus.

8. The apparatus of claim 1, wherein the controller is further configured to forward at least part of the unicast traffic to a third island through the second island.

9. The apparatus of claim 8, wherein:
   the third island is associated with a third gateway; and
   the controller is configured to identify the third gateway using a device index value associated with the third gateway, the device index value for the third gateway contained in a destination network address associated with at least part of the unicast traffic.

10. The apparatus of claim 1, wherein:
    the one or more nodes in the first island comprise one or more switches in the first island; and
    the traffic comprises Internet Protocol packets.

11. A method, comprising:
    receiving at a first gateway traffic from one or more nodes in a first island of a network, the received traffic comprising (i) unicast traffic from the one or more nodes in the first island, and (ii) at least one of broadcast traffic and multicast traffic comprising diagnostic messages from the one or more nodes in the first island, wherein the diagnostic messages comprise one or more maintenance messages;
    determining whether the unicast traffic is destined for a second island of the network;
    if the unicast traffic is destined for the second island, replacing a medium access control (MAC) address in the unicast traffic with a MAC address of a second gateway and forwarding the unicast traffic to the second gateway for delivery to one or more nodes in the second island, each of the one or more nodes in the second island having an address containing a device index of the second gateway;
    if the unicast traffic is not destined for another island, replacing the MAC address in the unicast traffic with a MAC address of a destination and forwarding the unicast traffic to the destination;
    blocking a portion of the broadcast and multicast diagnostic messages from being forwarded to the second island; and
    forwarding the one or more maintenance messages to the second island, wherein the one or more maintenance messages are configured to provide island-specific address information related to a location of any faults within the first island.

12. The method of claim 11, wherein:
    the network comprises a fault tolerant network; and
    the fault tolerant network is segmented into the first and second islands without interfering with an ability of the one or more nodes in the first island and the one or more nodes in the second island to route the traffic around one or more faults in the network.

13. The method of claim 11, further comprising:
    receiving second traffic from the one or more nodes in the second island, the second traffic comprising (i) unicast traffic from the one or more nodes in the second island, and (ii) at least one of broadcast traffic and multicast traffic comprising diagnostic messages from the one or more nodes in the second island;
forwarding the unicast traffic received from the second island to the first island; and
blocking at least a portion of the broadcast and multicast diagnostic messages received from the second island from being forwarded to the first island.

14. The method of claim 11, further comprising forwarding network time protocol traffic and simple network management protocol traffic from the one or more nodes in the first island to the second island.

15. The method of claim 11, further comprising identifying one or more faults in the network using the diagnostic messages.

16. The method of claim 11, wherein forwarding the unicast traffic comprises performing port filtering to allow only authorized traffic to enter the second island.

17. The method of claim 11, wherein the first gateway performs the receiving, forwarding, and blocking; and
further comprising exchanging information with a third gateway through at least one of the first and second islands, the third gateway performing the receiving, forwarding, and blocking upon a failure of the first gateway.

18. A non-transitory computer readable medium embodying a computer program, the computer program comprising computer readable program code for:
receiving at a first gateway traffic from one or more nodes in a first island of a network, the received traffic comprising (i) unicast traffic from the one or more nodes in the first island, and (ii) at least one of broadcast traffic and multicast traffic comprising diagnostic messages from the one or more nodes in the first island, wherein the diagnostic messages comprise one or more maintenance messages from the one or more nodes in the first island;
determining whether the unicast traffic is destined for a second island of the network;
if the unicast traffic is destined for the second island, replacing a medium access control (MAC) address in the unicast traffic with a MAC address of a second gateway and forwarding the unicast traffic to the second gateway for delivery to one or more nodes in the second island, each of the one or more nodes in the second island having an address containing a device index of the second gateway;
if the unicast traffic is not destined for another island, replacing the MAC address in the unicast traffic with a MAC address of a destination and forwarding the unicast traffic to the destination;
blocking a portion of the broadcast and multicast diagnostic messages from being forwarded to the second island; and
forwarding the one or more maintenance messages to the second island, wherein the one or more maintenance messages are configured to provide island-specific address information related to a location of any faults within the first island.

19. The non-transitory computer readable medium of claim 18, wherein:
the network comprises a fault tolerant network; and
the fault tolerant network is segmented into the first and second islands without interfering with an ability of the one or more nodes in the first island and the one or more nodes in the second island to route the traffic around one or more faults in the network.

20. The non-transitory computer readable medium of claim 18, further comprising computer readable program code for:
receiving second traffic from the one or more nodes in the second island, the second traffic comprising (i) unicast traffic from the one or more nodes in the second island, and (ii) at least one of broadcast traffic and multicast traffic comprising diagnostic messages from the one or more nodes in the second island;
forwarding the unicast traffic received from the second island to the first island; and
blocking at least a portion of the broadcast and multicast diagnostic messages received from the second island from being forwarded to the first island.

21. The non-transitory computer readable medium of claim 18, wherein a status of the one or more nodes in the second island is proxied by at least one of the gateways.

22. The non-transitory computer readable medium of claim 18, further comprising computer readable program code for:
rerouting the traffic from the first island for the first gateway to a third gateway between the first and second islands based on a lack of a receipt of a diagnostic message from the first gateway.

23. The non-transitory computer readable medium of claim 18, further comprising computer readable program code for:
generating one or more additional diagnostic messages;
communicating the one or more additional diagnostic messages to at least one node in the first island and at least one node in the second island; and
stopping the communication of the one or more additional diagnostic messages to the nodes in the first and second islands in response to detecting a loss of communication with either of the islands.

24. The non-transitory computer readable medium of claim 23, wherein the computer readable program code for generating the one or more additional diagnostic messages comprises computer readable program code for generating the one or more additional diagnostic messages using information from at least one of the gateways.

* * * * *